United States Patent [19]

Capelle

[11] Patent Number: 4,585,602
[45] Date of Patent: Apr. 29, 1986

[54] METHOD FOR FEEDING A NUMBER OF STRIPS OF MATERIAL INTO A SINGLE- OR MULTIPLE-EXTRUDER SYSTEM

[75] Inventor: Gerd Capelle, Langenhagen, Fed. Rep. of Germany

[73] Assignee: Hermann Berstorff Maschinenbau GmbH, Fed. Rep. of Germany

[21] Appl. No.: 616,198

[22] Filed: Jun. 1, 1984

[30] Foreign Application Priority Data

Jun. 3, 1983 [DE] Fed. Rep. of Germany ........ 3320203

[51] Int. Cl.[4] ............................................. B29C 45/13
[52] U.S. Cl. ................................ 264/37; 264/176 R; 264/349; 425/253; 425/217; 425/585; 425/DIG. 201
[58] Field of Search ..................... 425/131.1, 253, 578, 425/579, 580, 217, 585, DIG. 201; 226/171, 172; 198/598; 264/37, 176 R, 349

[56] References Cited

U.S. PATENT DOCUMENTS

| 1,952,470 | 3/1934 | Stephans | 425/131.1 |
| 2,096,362 | 10/1937 | Lehman | 425/131.1 |
| 3,670,869 | 6/1972 | Dimmock | 198/598 |

Primary Examiner—Jay H. Woo
Assistant Examiner—Timothy W. Heitbrink
Attorney, Agent, or Firm—Schwartz, Jeffery, Schwaab, Mack, Blumenthal & Evans

[57] ABSTRACT

A method and a device are disclosed for feeding a number of strips of material of one constituent from different batches thereof, into each extruder of a single- or multiple-extruder system in order to ensure that the extruder product from each extruder is more consistently uniform. To achieve this, such a system is fed from one end from pallets deposited on conveyor belts so that a plurality of strips of material from different batches, but of the same mixture, are fed into each appropriate extruder hopper. The empty pallets are removed from the pallet system by a conveyor belt passing along the charging end.

3 Claims, 4 Drawing Figures

METHOD FOR FEEDING A NUMBER OF STRIPS OF MATERIAL INTO A SINGLE- OR MULTIPLE-EXTRUDER SYSTEM

FIELD OF THE INVENTION

The present invention relates to a method of feeding strips of material into each extruder of a single- or multiple-extruder system and to a feed system suitable for carrying out such a method.

BACKGROUND OF THE INVENTION AND PRIOR ART DISCUSSION

U.S. Pat. No. 3,099,859 discloses a so-called triplex system for producing tread strips for motor vehicle tyres, the tread strip being formed from three different rubber mixtures. The three different mixtures at a time are extruded simultaneously into a tread strip injection moulding head and are discharged therefrom through a nozzle to form a tread strip. The three mixtures have very different properties from one another. Thus, for example, a highly wear-resistant rubber mixture is needed to form the tread surface, a very resilient rubber mixture is needed to produce the lateral surfaces of the tread strip and a very durable rubber mixture is needed to form the base of the strip.

Large quantities of each individual mixture must be prepared for the mass-production of automotive tyres, such individual mixtures being prepared in batches in internal mixers and rolling-mills. Lengths of the mixture are then removed from the rolling-mill and deposited, in a zig-zag manner, on wooden pallets or the like. In other words, a ready-mixed batch of material is deposited on one pallet at a time.

Each batch is produced using accurately-weighed amounts of the constituents of the mixture in both the internal mixers and in the rolling-mills. However, the mixing and blending of the constituents may vary in the internal mixers and rolling-mills with the result that the quality and/or characteristics may vary from one batch to another.

During further processing in a triplex system, such variations can cause, for example, the properties of the tread surface of an extruded tread strip to vary from batch to batch, which is obviously undesirable.

Moreover, it is evident that a triplex system comprising three separate extruders each requiring appropriate gears and drive motors, is very large, occupies a considerable amount of space and is both difficult and expensive to operate.

OBJECTS OF THE INVENTION

The present invention therefore seeks to provide a device whereby a single- or multiple-extruder system for the production of profiles from various mixtures of rubber, elastomers or other thermoplastics materials, can be charged with a number of strips of material. In particular, the invention seeks to provide a device which permits the production of tread strips which are of consistent quality in a single- or multiple-extruder system by making the individual components of the mixtures from which the tread strip is to be formed more consistently uniform.

In a subsidiary aspect, the present invention seeks to provide a device which permits the feeding of strips of components to be largely automated and which reduces the space occupied to a minimum.

SUMMARY OF THE INVENTION

According to the present invention, there is provided a method of feeding a plurality of strips of material into each extruder of a single- or multiple extruder system utilised for producing profiles from rubber or thermoplastics material, each extruder, in use, extruding one constituent of the profile, comprising the steps of disposing a plurality of batches of the constituent to be fed into the extruder on pallets, the plurality of batches each being in the form of a strip of material, conveying the laden pallets in series in a direction towards the material inlet of the extruder, feeding at least two strips from separate pallets simultaneously into a strip guiding device and thence into the inlet of the extruder removing empty pallets from the end of the pallet conveyor located nearer the material inlet and replacing said empty pallets by depositing new laden pallets on the pallet conveyor at the end thereof remote from the material inlet, wherein the strip guiding device is located above the pallet conveyor and wherein each extruder is charged from one end.

Also according to the present invention, there is provided a device for feeding a plurality of strips of material into each extruder of a single- or multiple-extruder system utilised for producing profiles from rubber or thermoplastics material, each extruder extruding one constituent of the profile, the device comprising a plurality of pallets, and at least one pallet conveyor device for conveying the pallets in a directon towards the material inlet of the extruder, each conveyor device carrying a plurality of pallets, at least one strip guiding device disposed above the at least one pallet conveyor devices the strip guiding device receiving at least two strips of the constituent simultaneously and transporting the strips to the material inlet of the extruder and a pallet removal conveyor extending transversely to the at least one pallet conveying device and being disposed at the end of the at least one pallet conveying device located nearer the material inlet of the extruder.

A pre-requisite for automating the feed and for reducing the space occupied by the feed device to a minimum is to ensure that all of the strips of material are fed into the extruders from one end.

Since each of the extruders in a multiple-extruder system is fed with a plurality of strips of the constituent to be extruded therefrom but from different batches thereof it is possible to obtain better uniformity of the constituent being fed into that extruder. In a preferred embodiment, four strips of the same constituent from four different batches are fed into the extruder for that constituent simultaneously.

Because the strips of material are removed from two pallets at a time and there are usually at least four pallets disposed on the pallet conveyor belt, there are at least two laden pallets in each row ready for use when one of the pallets carrying a strip being fed into the extruder becomes empty.

If, for example, material is fed into the extruder from the first and second pallets, that is to say, the pallets nearest the material inlet of the extruder, in a row of pallets and the first pallet becomes empty, the initial portion of the strip on the third pallet may be clamped very repidly into the strip conveyor belt device disposed thereabove.

All of the four pallets are then conveyed a pallet length nearer the material inlet whereby the empty first pallet is pushed onto the transverse conveying device and removed from the system. This provides room on the pallet conveyor belt for a new fourth laden pallet, so that, once again, two spare laden pallets are available.

By using such a system, for example, it is possible to feed twelve strips simultaneously into a triplex system; that is to say, to feed four strips at a time, from different batches but of the same material mixture, into each one of three extruders.

Continuity of the mode of operation of the system is achieved simply by transposing the initial portions of the strips on a new pallet into the clamping conveyor belt. By so doing, analysis of, for example, an extruded profile formed from three different mixtures shows that each of the constituents thereof is more uniformly consistent, even when the system is operated over a long period of time.

BRIEF DESCRIPTION OF THE DRAWINGS

One embodiment of the present invention will be described further, by way of example, with reference to the accompanying drawings, in which.

DETAILED DESCRIPTION OF THE PREFERRED EMBODIMENTS

Figure 1:
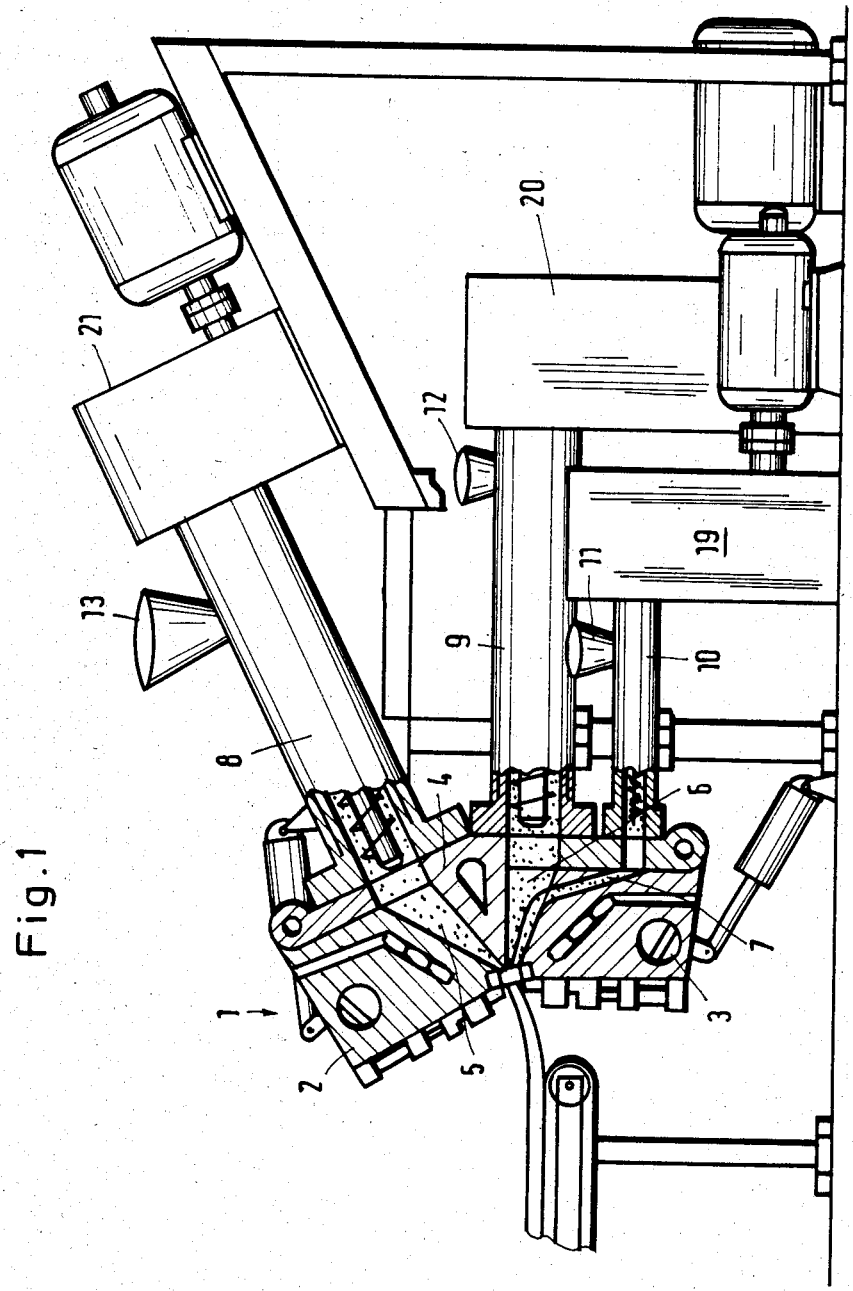
FIG. 1 is a longitudinal sectional view through a triplex extrusion system and through an extruded profile emerging therefrom.

In FIG. 1, there is shown an extrusion head 1 for extruding profiles. The head 1, which is known, comprises an upper portion 2, a lower portion 3 and a stationary central portion 4.

The head 1 has flow channels 5, 6 and 7 extending therethrough. The channels 5, 6 and 7 form the discharge outlets for extruders 8, 9 and 10 respectively. The drive devices for the extruders 8, 9 and 10 are referenced 21, 20 and 19 respectively. The extruders 8, 9 and 10 are fed with material through hoppers 13, 12 and 11 respectively.

Figure 2:
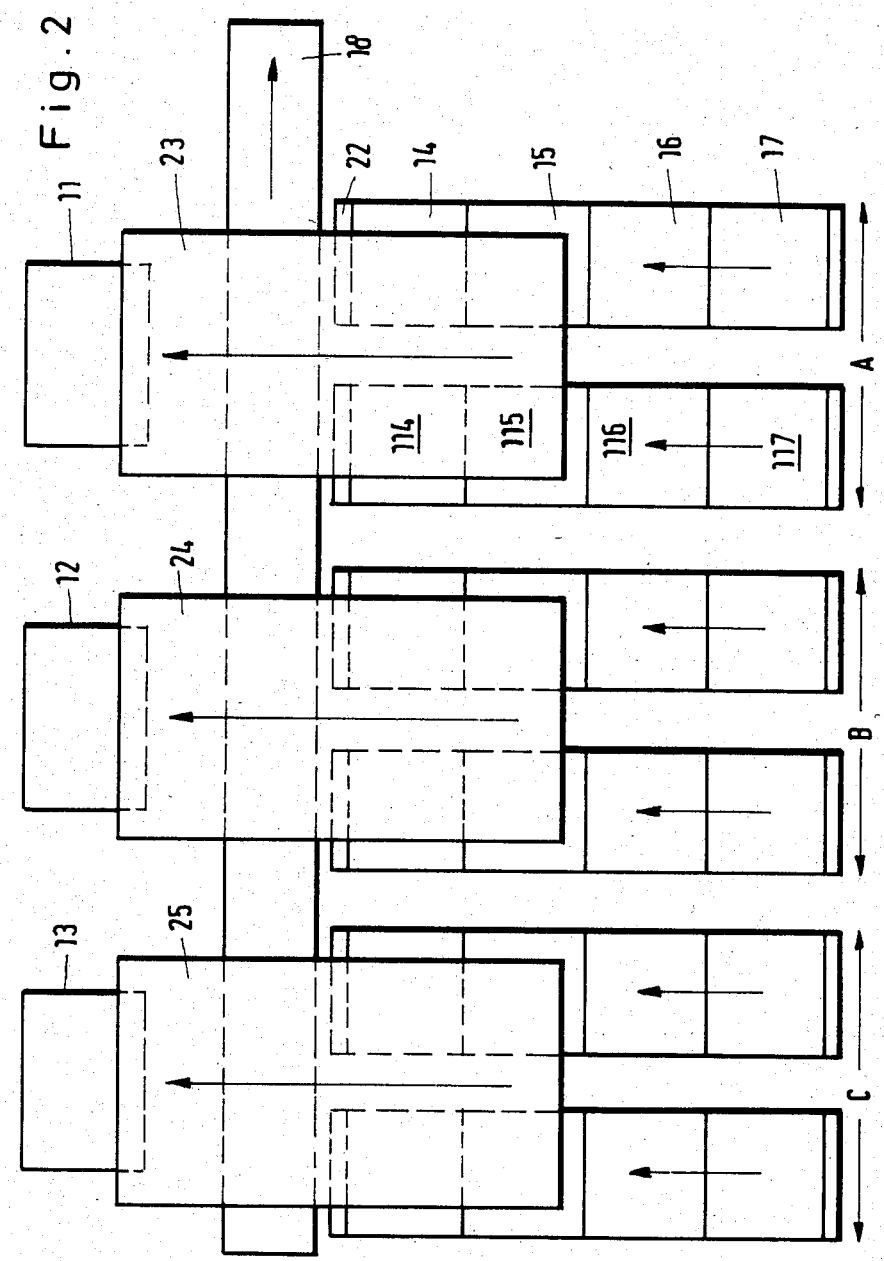
FIG. 2 is a schematic plan view of means for feeding each of the extruders shown in FIG. 1.

As can be seen from the schematic view of FIG. 2, each extruder hopper 11, 12 and 13 has a conveyor belt 23, 24 and 25 respectively associated therewith.

It will be assumed that a profile is to be produced from three mixtures A, B and C. Accordingly, mixture A is fed into the hopper 11 of extruder 10 by the conveyor belt 23, mixture B is fed into the hopper 12 of extruder 9 by the conveyor belt 24 and mixture C is fed into the hopper 13 of extruder 8 by the conveyor belt 25.

The arrangement and manner of supplying one of the mixtures to its appropriate hopper will now be described. Accordingly, eight batches of mixture A are prepared and these are disposed on pallets 14, 15, 16, 17, 114, 115, 116, and 117. The batches are preferably in the form of strips which have been laid, as shown, in a zig-zag manner on the pallets.

Figure 3:
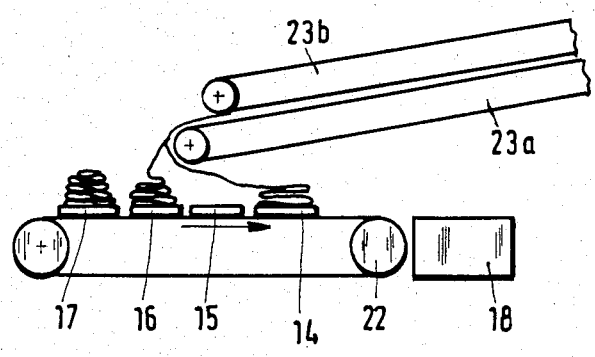
FIG. 3 is a schematic cross-sectional view through one of the feed means shown in FIG. 2 and shows batches of one of the components of the material arranged on the pallets, the batches on two of the pallets being transferred to a conveyor.
Figure 4:
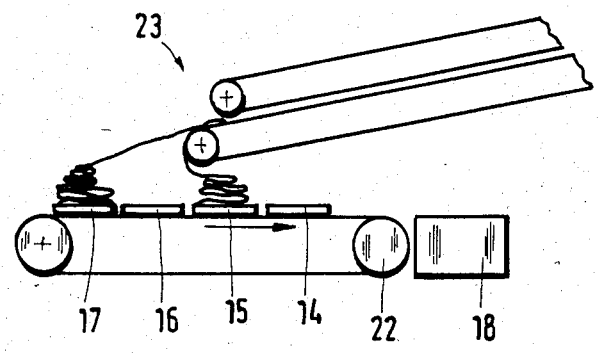
FIG. 4 is a schematic cross-sectional view similar to FIG. 3, but showing the material being removed from the other two pallets.

As shown in FIG. 3, strips of material are being removed from pallets 14 and 16, whilst the strip of material on pallet 15 has already been used and the strip on pallet 17 is yet to be used. The end portions of the strips being removed from pallets 14 and 16 has already been clamped between conveyor belts 23a and 23b and, when the belts 23a and 23b are operating, the strips are conveyed to the hopper 11. When pallet 14 is also empty, the end portion of the strip on pallet 17 is clamped between the conveyor belts 23a and 23b and the material from pallet 17 will be conveyed to the hopper 11. The pallets 14, 15, 16 and 17 are located on a conveyor belt 22. When the pallet 14 is empty, the conveyor belt 22 is operated and the empty pallets 14 and 15 are transferred onto a conveyor 18. This will, of course, cause the pallets 16 and 17 shown in FIG. 3 to move into the portions occupied by pallets 14 and 15 respectively in that figure. However, such movement does not interrupt the transfer of material from the pallets 16 and 17 to the hopper 11. New, full pallets are simultaneously deposited on the pallet conveyor belt 22 to occupy the empty spaces. It will be appreciated that, by so doing, batches of material can be continuously fed to the hopper 11. It will also be appreciated that an empty pallet or pallets can only be removed from the belt 22 when there are no occupied pallets located between it and the pallet removal conveyor 18.

A similar operation is carried out with the strips of material on the row of pallets 114, 115, 116 and 117. In other words, strips are simultaneously removed from, for example, the pallets 114 and 116 as well as from the pallets 14 and 16. Accordingly, four different strips are being fed at any one time to the hopper 11. Since only one batch of material at a time is deposited on a pallet, four different batches of mixture A are thus simultaneously fed into hopper 11 of the extruder 10. This will tend to cause the material extruded by the extruder 10 to be more consistent in quality and characteristics because, as will be appreciated, deficiencies in any one batch will be balanced by the presence of the other three batches.

The mixtures B and C are treated in a similar manner to that described above for mixture A and are ultimately fed to hoppers 12 and 13 respectively.

I claim:

1. A method of feeding a plurality of strips of a constituent material into each extruder of a multiple extruder system utilized for producing profiles from rubber or thermoplastics material, each of said plurality of strips being supplied from different batches of such constituent material, with each of said batches potentially having different characteristics from another batch or batches of the same constituent material, each extruder having a material inlet and, in use, extruding one constituent of the profile, comprising the steps of:
    (a) disposing a plurality of batches of the constituent to be fed into each extruder on a plurality of pallet means, each batch being in the form of a strip of material;
    (b) conveying the laden pallets on pallet conveyor means, each extruder having associated with it a separate pallet conveyor means, said pallets for each extruder being conveyed in series in a direction towards said material inlet of each extruder, said pallet conveyor means having a first end adjacent said material inlet and a second end remote from said material inlet;
    (c) simultaneously feeding at least two strips of material from separate pallets into strip guide means and thence into each extruder, said simultaneous feeding providing a more uniform and consistent constituent when fed into said extruder, said guide means being disposed above said pallet conveyor;

(d) removing empty pallets from said pallet conveyor means at said first end and in a direction transverse to the direction of feed of the pallets toward the material inlet of each extruder; and (e) replacing said empty pallets by depositing new laden pallets on said pallet conveyor means at said second end thereof, each said extruder being charged from one side.

2. A method as recited in claim 1, wherein said system comprises three extruders, each extruder extruding a separate constituent, and wherein four material strips of each constituent are fed to each associated extruder through said guide means from four different batches of said constituent.

3. A method as recited in claim 1, wherein two pallet conveyor means are provided for each extruder with four pallets being disposed on each said pallet conveyor means, whereby each extruder is simultaneously fed with four strips of material, two strips being fed from each set of four pallets.

* * * * *